2,819,214

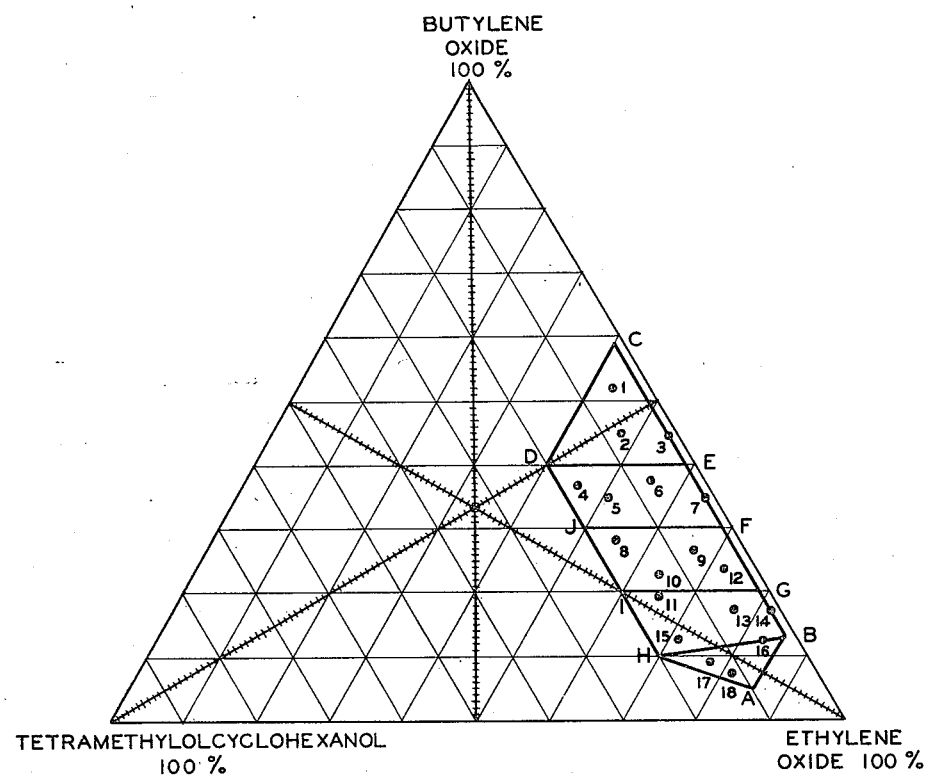

PROCESS FOR BREAKING PETROLEUM EMULSIONS EMPLOYING CERTAIN OXYALKYLATED TETRAMETHYLOLCYCLOHEXANOLS

Melvin De Groote, University City, and Owen H. Pettingill, Kirkwood, Mo., assignors to Petrolite Corporation, Wilmington, Del., a corporation of Delaware Application May 21, 1954, Serial No. 431,489

20 Claims. (Cl. 252—331)

This invention relates to processes or procedures particularly adapted for preventing, breaking or resolving emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipeline oil.

More specifically then, the present invention is concerned with a process for breaking petroleum emulsions employing a demulsifier including a cogeneric mixture of a homologous series of glycol ethers of tetramethylolcyclohexanol. The cogeneric mixture is derived exclusively from tetramethylolcyclohexanol, ethylene oxide and butylene oxide in such weight proportions so the average composition of said cogeneric mixture stated in terms of initial reactants lies approximately within the pentagon of the accompanying drawing in which the minimum tetramethylolcyclohexanol content is at least 1.5% and which pentagon is identified by the fact that its area lies within the straight lines connecting, A, B, C, D, and H.

We have found that when tetramethylolcyclohexanol is combined with butylene oxide and ethylene oxide in certain proportions and particularly when the butylene oxide is employed first, followed by use of ethylene oxide and more especially if the butylene oxide employed is one of the straight chain isomers

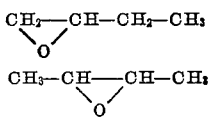

or a mixture of the two and if the composition falls within the limits indicated by the pentagon on the hereto attached triangular chart, said derivatives are of unusual effectiveness for a number of purposes particularly when surface activity is a factor, either directly or indirectly. One example is the use of such derivatives in the resolution of petroleum emulsions of the water-in-oil type.

In a general way the compounds which have been found most effective and fall within the limits of the chart are combinations where one part of tetramethylolcyclohexanol has been treated with about 11 to 39 parts of butylene oxide, by weight, and then reacted with 27 to 58.5 parts of ethylene oxide.

In another series 10 parts of tetramethylolcyclohexanol have been reacted with 6 parts by weight of butylene oxide and 85 parts by weight of ethylene oxide; in another series 1.5 parts by weight of butylene oxide and 85 parts by weight of ethylene oxide. Similarly, in another series the following combinations have ben used: 1.5 parts of tetramethylolcyclohexanol combined with 58.5 parts by weight of butylene oxide and 40 parts by weight of ethylene oxide; 20 parts by weight of tetramethylolcyclohexanol, reacted with 40 parts by weight of butylene oxide and then with 40 parts by weight of ethylene oxide. In another series 20 parts by weight of tetramethylolcyclohexanol were reacted with 10 parts by weight of butylene oxide and then 70 parts by weight of ethylene oxide.

It is of interest to note in some instances as little as 1.5 parts of tetramethylolcyclohexanol may be combined with 98.5 parts of the two oxides to produce very valuable derivatives.

We have also found that where part of the butylene oxide is replaced by propylene oxide, i. e., where a combination of tetramethylolcyclohexanol, butylene oxide, propylene oxide and ethylene oxide are used, effective and valuable surface-active agents can also be obtained. This, however, represents a separate invention.

For the purpose of resolving petroleum emulsions of the water-in-oil type, we prefer to employ oxyalkylated derivatives, which are obtained by the use of monoepoxides, in such manner that the derivatives so obtained have sufficient hydrophile character to meet at least the test set forth in U. S. Patent No. 2,499,368, dated March 7, 1950, to De Groote and Keiser. In said patent such test for emulsification using a water-insoluble solvent, generally xylene, is described as an an index of surface activity.

The above mentioned test, i. e., a convention emulsification test, simply means that the preferred product for demulsification is soluble in a solvent having hydrophobe properties or in an oxygenated water insoluble or even a fraction of a water-soluble hydrocarbon solvent and that when shaken with water the product may remain in the non-aqueous solvent or, for that matter it may pass into the aqueous solvent. In other words, although it is xylene soluble, for example, it may also be water soluble to an equal or greater degree.

For purposes of convenience what is said hereinafter will be divided into three parts:

Part 1 is concerned with the oxyalkylation of tetramethylolcyclohexanol in general;

Part 2 is concerned with the oxyalkylation of tetramethylolcyclohexanol using two different oxides, i. e., butylene oxide and ethylene oxide so as to produce derivatives falling within certain composition limitations hereinafter noted in detail. For convenience, Part 2 is divided into two sections, Section A is concerned with oxybutylation and oxyethylation broadly, and Section B is concerned with the specified compositions and illustrate such combinations;

Part 3 is concerned with the resolution of petroleum emulsions of the water-in-oil type by means of the previously described chemical compounds.

PART 1

At the present time there is available butylene oxide which includes isomeric mixtures, for instance, one manufacturer has previously supplied a mixed butylene oxide which is in essence a mixture of 1-butene oxide, 2-butene oxide isomers and approximately 10% isobutylene oxide. Another manufacturer has supplied an oxide which is roughly a fifty-fifty mixture of the cis- and trans-isomers of 2-butene oxide.

There is also available a butylene oxide which is characterized as straight chain isomers being a mixture of the 1,2 and the 2,3 isomers and substantially free from the isobutylene oxide.

This latter product appears to consist of 80% of the 1,2 isomer and 15% of the mixed 2,3 cis- and 2,3 trans-isomer. We have obtained the best results by using an oxide that is roughly 80% or more of the 1,2 isomer and with either none, or just a few percent if any, of the isobutylene oxide, the difference being either form of the 2,3 or a mixture of the two forms.

Our preference is to use an oxide substantially free from the isobutylene oxide, or at least having minimum amounts of isobutylene oxide present.

Since the varying solubility of different butanols is well known, it is unnecessary to comment on the effect that the varying structure has on solubility of derivatives obtained from butylene oxide. Purely by way of example, the applicants have tested the solubility of the first two available butylene oxides and noted in one instance the butylene oxide would only dissolve to the extent of 6 grams in 100 grams of water. These tests were made at 25° C.

As to further reference in regard to the isomeric butylene oxides see "Chemistry of Carbon Compounds," volume I, part A, "Aliphatic Compounds," edited by E. H. Rodd, Elsevier Publishing Company, New York, 1951, page 671.

As to the difference in certain proportions of the cis- and trans-form of straight chain isomers 2,3-epoxybutane see page 341 of "A Manual of Organic Chemistry," volume 1, G. Malcolm Dyson, Longmans, Green and Company, New York, 1950.

Reference to butylene oxide herein of course is to the compound or compounds having the oxirane ring and thus excludes 1,4-butylene oxide (tetrahydrofurane) or a tri-methylene ring compound.

When reference is made to the oxides, for instance ethylene oxide and butylene oxide, one can use the corresponding carbonates. Ethylene carbonate is available commercially. Butylene carbonate, or the carbonate corresponding to a particular oxide, is not available commercially but can be prepared by the usual methods in the laboratory. For this reason further reference to the alkylene carbonates will be ignored although it is understood when oxyethylation takes place by means of ethylene carbonate one could, of course, use butylene carbonate for oxybutylation.

In the present invention we have found that outstanding products are obtained by the use of certain preferred butylene oxides, i. e., those entirely free or substantially free (usually 1% or less) and composed of approximately 85% or more of the 1,2 isomer with the remainder, if any, being the 2,3-isomer.

In the preparation of the outstanding compounds we have studiously avoided the presence of the isobutylene oxide as far as practical. When any significant amount of isobutylene oxide happens to be present, the results are not as satisfactory regardless of the point when the butylene oxide is introduced. One explanation may be the following. The initial oxybutylation which may be simplified by reference to a monohydric alcohol, produces a tertiary alcohol. Thus the oxybutylation in the presence of an alkaline catalyst may be shown thus:

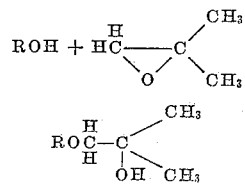

Further oxyalkylation becomes difficult when a tertiary alcohol is involved although the literature records successful oxyalkylation of tertiary alcohols. This does not necessarily apply when oxyalkylation takes place in the presence of an acidic catalyst, for instance, a metallic chloride such as ferric chloride, stannic chloride, aluminum chloride, etc. The difficulty there is that tetra-methylolcyclohexanol under such conditions sometime appears to dehydrate. See U. S. Patent No. 1,757,468, dated May 6, 1930, to Muller et al. Thus, if dehydration does take place oxyalkylation then involves not only tetra-methylolcyclohexanol, but also the products of dehydration and also water. We have tried procedures such as using an alkaline catalyst and tetramethylolcyclohexanol, employing approximately 4 to 6 moles of isobutylene oxide per mole of tetramethylolcyclohexanol. Afterwards the amount of acid was added equal to the amount of caustic used as catalyst, the reaction mass was dried, and then stannic chloride added. Under such circumstances the results suggest more satisfactory oxybutylation as such although the procedure becomes cumbersome, uneconomical and perhaps even impractical.

This, however, seems to be only a partial explanation. Another explanation may rest with the fact that isobutylene oxide may show a tendency to revert back to isobutylene and oxygen and this oxygen may tend to oxidize the terminal hydroxyl radicals. This possibility is purely a matter of speculation, but may account for the reason we obtain much better results using a butylene oxide as specified. In regard to this reaction, i. e., possible conversion of an alkylene oxide back to the olefine and nascent oxygen, see "Tall Oil Studies: II. Decolorization of Poly-ethenoxy Tallates with Ozone and Hydrogen Peroxide," J. V. Karabinos et al., J. Am. Oil Chem. Soc. 31, 71 (1954).

In order to illustrate why the herein contemplated compounds or said products are cogeneric mixtures and not single chemical compounds, and why they must be described in terms of manufacture, and molal ratio or percentage ratio of reactants, reference is made to a monohydric alcohol. Tetramethylolcyclohexanol, of course, is a polyhydric alcohol having 5 hydroxyls. However, one need only consider what happens when a monohydric alcohol is subjected to oxyalkylation.

If one selects any hydroxylated compound and subjects such compound to oxyalkylation, such as oxyethylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent which, for sake of convenience, may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Paul J. Flory, which appeared in Chemical Reviews, volume 39, No. 1, page 137.

Unfortunately, as has been pointed out by Flory and other investigators, there is no satisfactory method based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many times in the case of a penta hydric compound such as tetramethylolcyclohexanol. This is particularly true even in regard to ethylene oxide alone but becomes even more complicated when butylene oxide is used in light of what has been said previously in regard to the isomers of butylene oxide.

PART 2

Section A

As to the oxyalkylation of tetramethylolcyclohexanol one need only employ the procedure described in U. S. Patent No. 2,652,418, dated September 15, 1953, to De Groote. It is immaterial whether one employs ethylene oxide, or butylene oxide and particularly if the butylene oxide is the straight chain isomer. Indeed, when butylene is used (the straight chain isomer or mixture of straight chain isomers) the same procedure can be followed as in the use of propylene oxide as described in Examples 1a through 6a in the aforementioned U. S. Patent No. 2,652,418. Butylene oxide equal in weight is substituted for propylene oxide and the reaction proceeds under substantially the same conditions; or, if desired a molar equivalent of butylene oxide may be used for propylene oxide, i. e., approximately one-fourth greater amount in weight. Under such circumstances it may be a little longer time for the reaction to take place or it may be desirable to use a slightly higher temperature, or even a slightly increased amount of catalyst. However, for all practical purposes the reactions go under substantially the same conditions.

What has been said in regard to propylene oxide applies with equal force to ethylene oxide. Indeed, ethylene oxide is more reactive than either propylene oxide or butylene oxide. In other words, one can follow the same procedure as in regard to Examples 1a through 6a previously mentioned, using an equal weight of ethylene oxide and combination will take place as rapidly, or perhaps more rapidly, than if propylene oxide had been used.

Actually, we have found it is perfectly satisfactory to powder tetramethylolcyclohexanol and oxyalkylate in the same way one would in the case of powdered sorbitol, i. e., add an inert solvent and the catalyst and proceed with the oxyalkylation. U. S. Patent No. 2,552,528, dated March 15, 1951, to De Groote, is concerned with the oxyalkylation of polyols and examples include both sorbitol (see Example A in column 16 of said patent), and also 2,2,6,6-tetramethylolcyclohexanol (see Example 20 in Table I). Thus, one can conveniently follow the specific directions of aforementioned U. S. Patent 2,662,528.

When butylene oxide is used the same procedure can be followed as in the use of propylene oxide as described in Example A in Part 2 of the aforementioned U. S. Patent 2,552,628. The powdered tetramethylolcyclohexanol, mixed with an inert solvent, and an alkaline catalyst, is reacted with the butylene oxide and as oxybutylation takes place the reaction mass becomes a homogeneous liquid. For instance, referring to Example A, column 16 of the aforementioned Patent 2,552,528 we have used identically the same procedure starting with anhydrous finely powdered tetramethylolcyclohexanol and instead of using 1600 grams of propylene oxide there was used instead 1800 grams of butylene oxide (mixed straight chain isomers).

In Example B, instead of using 1100 grams of the propylene oxide derived intermediate from Example A, preceding, there was used instead 1191 grams of the butylene oxide derived intermediate, Example A. Instead of using 1327 grams of propylene oxide, there was added 1493 grams of butylene oxide.

In Example C, instead of using 1149 grams of propylene oxide derived intermediate Example B, from the preceding example, there was used instead 1271 grams of butylene oxide derived intermediate B. Instead of adding 1995 grams of propylene oxide in this stage, there was added instead 2345 grams of butylene oxide.

In Example D, instead of 743 grams of the propylene oxide derived intermediate from Example C, preceding, there was used 831 grams of the butylene oxide derived intermediate. Instead of adding 637 grams of propylene oxide in this stage, there was added 717 grams of butylene oxide.

It will be noted at this stage the ratio of butylene oxide to tetramethylolcyclohexanol was approximately 100-to-1 and the amount of tetramethylolcyclohexanol represents less than 3%, by weight, of the end product and the amount of butylene oxide represented over 97%.

Example E was conducted in the same manner except that the initial reactant was Example D, preceding, and instead of using 566 grams, there was used instead 628 grams of the reactant. Instead of adding 563 grams of propylene oxide, there was added instead 633 grams of butylene oxide.

In this last example, five grams of sodium methylate were added as a catalyst to speed up the final stage of reaction. Operating conditions, such as temperature, time factor, etc., were substantially the same as described in the corresponding Examples A, B, C, D and E, in the aforementioned U. S. Patent 2,552,528.

It will be noted that in this final product approximately 200 moles of butylene oxide were employed per mole of tetramethylolcyclohexanol. On a percentage basis, the product represented approximately 1% of tetramethylolcyclohexanol, and 99% butylene oxide.

All examples, except the first stage, were substantially water-insoluble and xylene soluble.

It is to be noted that this procedure could be employed, or any equivalent procedure to give products which can then be reacted with ethylene oxide for the reason that they are liquids, to yield compositions which come within the five-sided figure identified in the drawing as A, B, C, D and E.

Inversely, one can follow the exact directions in regard to Examples A, B, C, D and E as they appear in U. S. Patent 2,552,528 but replacing propylene oxide with ethylene oxide. The amount of ethylene oxide to be added can be predetermined from what is said subsequently so that subsequent reaction with butylene oxide brings the final composition within the herein described limits. The oxyethylated tetramethylolcyclohexanol reacts with butylene oxide with the same ease that one would handle any other comparable reactant.

In any event, starting with any suitable stage of an oxybutylated tetramethylolcyclohexanol, one can oxyethylate to obtain a composition corresponding to any selected point which determines the area A, B, C, D and E, or any point within the area A, B, C, D and E.

Inversely stated, at any suitable stage of an oxyethylated tetramethylolcyclohexanol, one can oxybutylate to obtain a composition corresponding to any selected point which determines the area A, B, C, D and E, or any point within the area, A, B, C, D and E.

In regard to oxyethylation in contrast with oxybutylation, or for that matter oxypropylation, it would be noted that the reactions generally go more readily since ethylene oxide is a more reactive alkylene oxide and the operating pressures are apt to be somewhat lower. Thus, where pressures of 30 to 45 pounds may occur with butylene oxide, for example, one finds that with ethylene oxide they may be anywhere from 15 to 20 pounds. Also, the temperature of oxyethylation is usually lower, for instance, 130° to 135° C. Under such circumstances using the same proportion of catalyst by weight, i. e., either sodium methylate or caustic soda, the reaction is apt to take place in a somewhat shorter time than in the case of butylene oxide, for instance, about 75% to 90% of the time required for butylene oxide, or for that matter, for propylene oxide.

Example AA

On a larger operation it has been our preference to oxybutylate first with the mixed straight chain isomer and then oxyethylate. The powdered tetramethylolcyclohexanol was employed using benzene or a similar solvent, such as a high boiling aromatic petroleum solvent.

The vessel used was simply a larger autoclave, capacity about 125 gallons, of the kind described in the initial paragraph of Part 2, column 15, aforementioned U. S. Patent 2,552,528.

Generally speaking, we have heated the mixture to about 112° to 115° C. and then passed through a stream of dry nitrogen gas. While the dry nitrogen gas was being passed through the mixture the temperature was raised to 125° to 130° C. The passage of the gas was stopped and the contents subjected to vacuum. Oxyalkylation was then started under these conditions which meant the removal of practically any traces of excess moisture which might be present. In some instances even a higher temperature was used for the nitrogen gas purge and also for the initial operation. In one example the amount of tetramethylolcyclohexanol used was 45 pounds. 5% by weight of finely powdered caustic soda was added and the mixture stirred and heated to 150° C., and purged with nitrogen, and then subjected to a vacuum equivalent to about 10 to 12 inches of mercury so as to remove any water or moisture. 43 pounds of butylene oxide (mixed straight chain isomers) were added over a 3½ hour period at an initial temperature of 140° to 145° C. The pressure was 10 to 15 pounds per square inch. As the reaction started the temperature was lowered approximately a few degrees so at the end of the first hour it stood at about 135° to 140° C. for the remainder of the oxyalkylation period.

In the second stage the procedure was repeated without adding any more catalyst, but adding another equal weight of the butylene oxide (43 pounds). This was continued through seven stages with the variation that during the last stage instead of adding 43 pounds of butylene oxide only one-half the amount was added, to wit, 21½ pounds. Furthermore, during this seventh stage the reaction had gradually slowed up so it took longer to add the 21½ pounds, to wit, 5 hours, than it did to add the 43 pounds in the early stages. At the end of this seventh period the amount of butylene oxide added was approximately 301 pounds of butylene oxide to 43 pounds of tetramethylolcyclohexanol. At this stage, 2.2 pounds of powdered caustic soda were again added, the autoclave flushed out again, subjected to vacuum again to be sure to eliminate any moisture that may have been introduced inadvertently in opening the autoclave and the series repeated with the same size addition until again 86 pounds of butylene oxide had been added in two separate steps, using the same temperature range and the same pressure range and using a time period varying from 3½ hours to 7 hours.

In the final product, 43 pounds of tetramethylolcyclohexanol had been combined with 387 pounds of butylene oxide, representing 10% of tetramethylolcyclohexanol and 90% of butylene oxide. Small portions of this product were subjected to treatment with more butylene oxide to a point where mixtures were obtained representing approximately 98% or more oxide and 2% or less of tetramethylolcyclohexanol.

As previously pointed out, these oxybutylated tetramethylolcyclohexanol were subjected to oxyethylation in the same manner described elsewhere and in a manner which is conventional.

The same procedure using powdered tetramethylolcyclohexanol was employed in connection with ethylene oxide and the same mixtures on a percentage basis obtained from ethylene oxide and tetramethylolcyclohexanol as in the above example where butylene oxide and tetramethylolcyclohexanol were obtained.

The same procedures have been employed using other butylene oxides including mixtures having considerable isobutylene oxide and mixtures of the straight chain isomers with greater or lesser amounts of the 2,3 isomer.

Where reference has been made in previous examples to the straight chain isomer, the product used was one which was roughly 85% or more of the 1,2 isomer and approximately 15% of the 2,3-cis- and the 2,3-transisomer with substantially none or not over 1% of the isobutylene oxide.

In the preceding procedures one oxide has been added and then the other. One need not follow this procedure. The two oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the butylene oxide or ethylene oxide groups. In such instances the procedure again is identically the same as previously described and, as a matter of fact, we have used such methods in connection with powdered tetramethylolcyclohexanol.

If desired, one may add part of one oxide and all of the other and then return to the use of the first oxide, for instance; or one may use the procedure as previously, adding first some butylene oxide, then ethylene oxide and then the butylene oxide. Or, inversely, one may add some ethylene oxide, then all butylene oxide and then the remainder of the ethylene oxide; or either oxide could be added in portions so that first one oxide is added, then the other, then the first oxide is added again, and then the second oxide. We have found no advantage in so doing. Indeed, our preference has been to add all the butylene oxide first and then the required amount of ethylene oxide.

As previously pointed out, tetramethylolcyclohexanol can be oxyethylated in the same way it is oxybutylated, i. e., by powdering the tetramethylolcyclohexanol, using a suitable catalyst, particularly an alkaline catalyst, and adding the ethylene oxide. The changes previously mentioned are of difference in degree only. In other words, oxyethylation will take place at a lower temperature, for instance, a top temperature of probably 130° to 135° C. instead of 145° to 140° C. The same weight of ethylene oxide could be added in 75% to 85% of the time required for butylene oxide. The pressure during the reaction, instead of being 10 to 15 pounds as in the case of butylene oxide, is apt to be 35 to 45 pounds and at times a little higher. Otherwise, there is no difference.

Also, if desired, the use of ethylene carbonate is a very convenient way of oxyethylating tetramethylolcyclohexanol. In fact, it can be oxyethylated without the use of pressure.

One can oxyalkylate using an acid catalyst or an alkaline catalyst or at least in part, without the use of any catalyst although such procedure is extremely slow and uneconomical. In other words, any one of the conventional catalysts used in oxyalkylation may be employed. It is our preference, however, to use an alkaline catalyst such as sodium methylate, caustic soda, or the like.

Section B

In light of what has been said previously, particularly in Section A, it is obvious that hardly any directions are required to produce the compounds herein specified. However, referring to the composition of the initial reactants based on the five-sided figure in the attached drawing, it will be noted we have calculated the percentage of the three initial reactants for the points A, B, C, D, E, F, G, H, I and J which appear on the boundary of the five-sided figure and also determine the five subdivided parts of the five-sided figure, two parts being triangles and the others being two parallelograms, and one trapezoid. Likewise, we have calculated the composition for a number of examples within the area of the graph and corresponding to points 1 to 18, inclusive. Note these data are included in Table I, immediately following:

TABLE I

| Points on boundary of area | Tertiary mixture, percent basis | | | Binary intermediate mixtures, percent basis | | | |
|---|---|---|---|---|---|---|---|
| | Tetra- methyl- ol- cyclo- hexanol | Butyl- ene oxide | Ethyl- ene oxide | Tetra- methyl- ol- cyclo- hexanol | Butyl- ene oxide | Tetra- methyl- ol- cyclo- hexanol | Ethyl- ene oxide |
| A | 10.0 | 5.0 | 85.0 | 66.6 | 33.4 | 10.5 | 89.5 |
| B | 1.5 | 13.5 | 85.0 | 10.0 | 90.0 | 1.7 | 98.3 |
| C | 1.5 | 58.5 | 40.0 | 2.5 | 97.5 | 3.6 | 96.4 |
| D | 20.0 | 40.0 | 40.0 | 33.4 | 66.6 | 33.4 | 66.6 |
| E | 1.5 | 40.0 | 58.5 | 3.6 | 96.4 | 2.5 | 97.5 |
| F | 1.5 | 30.0 | 68.5 | 4.75 | 95.25 | 2.14 | 97.86 |
| G | 1.5 | 20.0 | 78.5 | 7.0 | 93.0 | 1.87 | 98.13 |
| H | 20.0 | 10.0 | 70.0 | 66.6 | 33.4 | 22.2 | 77.8 |
| I | 20.0 | 20.0 | 60.0 | 50.0 | 50.0 | 25.0 | 75.0 |
| J | 20.0 | 30.0 | 50.0 | 40.0 | 60.0 | 28.6 | 71.4 |
| 1 | 5.0 | 52.5 | 42.5 | 8.68 | 91.32 | 10.5 | 89.5 |
| 2 | 8.0 | 44.0 | 48.0 | 15.4 | 84.5 | 14.3 | 85.7 |
| 3 | 1.5 | 54.5 | 44.0 | 2.68 | 97.32 | 3.3 | 96.7 |
| 4 | 18.0 | 36.5 | 45.5 | 33.0 | 67.0 | 28.3 | 71.7 |
| 5 | 15.0 | 33.5 | 51.5 | 31.0 | 69.0 | 22.6 | 77.4 |
| 6 | 7.5 | 36.5 | 56.0 | 17.1 | 82.9 | 11.8 | 88.2 |
| 7 | 1.5 | 34.5 | 64.0 | 4.16 | 95.84 | 2.3 | 97.7 |
| 8 | 17.0 | 28.0 | 55.0 | 37.7 | 62.3 | 23.6 | 76.4 |
| 9 | 7.0 | 26.0 | 67.0 | 21.2 | 78.8 | 9.5 | 90.5 |
| 10 | 13.5 | 22.5 | 64.0 | 37.5 | 62.5 | 17.4 | 82.6 |
| 11 | 15.5 | 19.0 | 65.5 | 44.8 | 55.2 | 19.2 | 80.8 |
| 12 | 4.5 | 23.0 | 72.5 | 16.35 | 83.65 | 5.85 | 94.15 |
| 13 | 6.0 | 17.0 | 77.0 | 73.9 | 7.2 | 92.8 |  |
| 14 | 1.5 | 17.0 | 81.5 | 8.1 | 91.9 | 1.8 | 98.2 |
| 15 | 16.0 | 12.5 | 71.5 | 56.2 | 43.8 | 18.3 | 81.7 |
| 16 | 4.5 | 13.0 | 82.5 | 25.7 | 74.3 | 5.2 | 94.8 |
| 17 | 13.5 | 9.0 | 77.5 | 60.0 | 40.0 | 14.8 | 85.2 |
| 18 | 11.5 | 7.0 | 81.5 | 62.1 | 37.9 | 12.35 | 87.65 |

Note the first column gives the particular point on the boundary of the five-sided figure or within the five-sided figure area. Note the next three columns represent the tertiary mixture which corresponds to the initial reactants, to wit, the percentages, by weight, of tetramethylolcyclohexanol, butylene oxide and ethylene oxide. Thus it is apparent that one could select any particular point and simply use the appropriate number of pounds of oxide; for instance, in regard to point A all that would be necessary would be to mix 5 pounds of butylene oxide with 85 pounds of ethylene oxide and use the mixture to oxyalkylated 10 pounds of tetramethylolcyclohexanol.

Similarly, in Example B, one need only mix 13.5 pounds of butylene oxide with 85 pounds of ethylene oxide and use the mixture to oxyalkylated 1.5 pounds of tetramethylolcyclohexanol in the manner previously indicated.

Note the fifth and sixth columns represent binary intermediate mixtures. For instance, in regard to the various points on the boundary and within the five-sided figure area, we have calculated the initial mixture using tetramethylolcyclohexanol and butylene oxide in the first case and using tetramethylolcyclohexanol and ethylene oxide in the second case, which would be employed for subsequent oxyalkylation to give the particular composition required. Note that a binary intermediate for the preparation of point A can be prepared in any suitable manner involving 66.6% of tetramethylolcyclohexanol and 33.4% of butylene oxide. Thus, for example one could use 66.6 pounds of tetramethylolcyclohexanol and 33.4 pounds of butylene oxide, or on a larger scale one could use 666 pounds of tetramethylolcyclohexanol and 334 pounds of butylene oxide.

Referring now to the tertiary mixture table, it is apparent that for point A tetramethylolcyclohexanol and butylene oxide together represent 15%, and ethylene oxide 85%. Therefore, one could employ 15 pounds of the binary mixture and react it with 85 pounds of ethylene oxide.

Similarly, in regard to the fifth and sixth columns for point B, the initial mixture involved tetramethylolcyclohexanol and butylene oxide, representing 10% of tetramethylolcyclohexanol and 90% of butylene oxide. If desired, 10 pounds of tetramethylolcyclohexanol could be reacted with 90 pounds of butylene oxide. Such mixture need only be reacted with ethylene oxide by reacting 15 pounds of the mixture with 85 pounds of ethylene oxide. This is obvious from the data in regard to the tertiary mixtures.

Referring now to columns 7 and 8, it is obvious one could readily produce an oxyethylated tetramethylolcyclohexanol and then subject it to reaction with butylene oxide. Using this procedure in regard to A, it is obvious that the mixture represents 10.5% of tetramethylolcyclohexanol and 89.5% of ethylene oxide. This product could be obtained from a binary mixture of 105 pounds of tetramethylolcyclohexanol and 895 pounds of ethylene oxide.

Referring now to the tertiary mixture table, it is obvious that 95 pounds of such mixture could be reacted with 5 pounds of butylene oxide to give point A. Similarly, in regard to point B the oxyethylated tetramethylolcyclohexanol represents 1.7% of tetramethylolcylohexanol and 98.3% ethylene oxide. The mixture so obtained by referring to the tertiary mixture table would be reacted with butylene oxide in the proportion of 86.5 pounds of the mixture and 13.5 pounds of butylene oxide.

As previously pointed out, the oxyalkylation of tetramethylolcyclohexanol has been described in the literature and is described also in detail above. All one need do is employ such conventional oxyalkylation procedure to obtain products corresponding to the compositions as defined. Attention is again directed to the fact that one need not add the entire amount of either oxide at one time but that a small portion of one could be added and then another small portion of the other, and the process repeated.

Purely for purpose of illustration, we have prepared examples three different ways corresponding to the compositions shown on the chart. In the first series the butylene oxides and ethylene oxide were mixed; this series is indicated as Aa, Ba, through and including 18a in the second series butylene oxide was used first followed by ethylene oxide and this series indicated Ab, Bb, through and including 18b; and finally in the third series ethylene oxide was used followed by butylene oxide and the series identified as Ac, Bc, through and including 18c.

TABLE II

| Composition corresponding to following point | Composition where oxides are mixed prior to oxy- alkylation | Composition where butyl- ene oxide used first followed by ethylene oxide | Composition where ethyl- ene oxide used first followed by butylene oxide |
|---|---|---|---|
| A | Aa | Ab | Ac |
| B | Ba | Bb | Bc |
| C | Ca | Cb | Cc |
| D | Da | Db | Dc |
| E | Ea | Eb | Ec |
| F | Fa | Fb | Fc |
| G | Ga | Gb | Gc |
| H | Ha | Hb | Hc |
| I | Ia | Ib | Ic |
| J | Ja | Jb | Jc |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |
| 15 | 15a | 15b | 15c |
| 16 | 16a | 16b | 16c |
| 17 | 17a | 17b | 17c |
| 18 | 18a | 18b | 18c |

The products obtained by the above procedure usually show some color varying from a light amber to a pale straw. They can be bleached in the usual fashion using bleaching clays, charcoal, or an organic bleach, such as peroxide or peracetic acid, or the like.

Such products also have present a small amount of alkaline catalyst which can be removed by conventional means, or they can be neutralized by adding an equivalent amount of acid, such as hydrochloric acid. For many purposes the slight amount of residual alkalinity is not objectionable.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by oxide which would introduce substantially the same group along with a side chain, for instance, one could employ glycidyl methyl ether, glycidyl ethyl ether, glycidyl isopropyl ether, glycidyl butyl ether or the like.

In the hereto appended claims reference has been made to "glycol ethers of tetramethylolcyclohexanol." Actually it well may be that the products should be referred to as "polyol ethers of tetramethylolcyclohexanol" in order to emphasize the fact that the final products of reaction have more than two hydroxyl radicals. However, the products may be considered as hypothetically derived by reaction of tetramethylolcyclohexanol with the glycols, such as ethylene glycol, butylene glycol, propylene glycol, or polyglycols. For this reason there seems to be a preference to use the terminology "glycol ethers of tetramethylolcyclohexanol."

PART 3

As to the use of conventional demulsifying agents, reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 18b, herein described.

Having thus described our invention, what we claim as new and desire to secure by Letters Patent, is:

1. A process for breaking petroleum emulsions of the water-in-oil type characterized by subjecting the emulsion to a demulsifying agent including a cogeneric mixture of a homologous series of glycol ethers of tetramethylolcyclohexanol; said cogeneric mixture being derived exclusively from tetramethylolcyclohexanol, ethylene oxide and butylene oxide in such weight proportions so the average composition of said cogeneric mixture, stated in terms of initial reactants, lies approximately within the 5-sided figure of the accompanying drawing in which the minimum tetramethylolcyclohexanol content is at least 1.5% and which 5-sided figure is identified by the fact that its area lies within the straight lines connecting A, B, C, D and H.

2. The process of claim 1 with the proviso that oxyalkylation takes place in presence of an alkaline catalyst.

3. The process of claim 1 with the proviso that oxyalkylation takes place in presence of an alkaline catalyst and that the butylene oxide be added first.

4. The process of claim 1 with the proviso that oxyalkylation takes place in presence of an alkaline catalyst and that the butylene oxide be added first, and with the further proviso that the butylene oxide is substantially free from isobutylene oxide.

5. The process of claim 1 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

6. The process of claim 5 with the proviso that the reactant composition falls within the triangular area defined by C, D, and E.

7. The process of claim 5 with the proviso that the reactant composition falls within the parallelogram D, E, F, and J.

8. The process of claim 5 with the proviso that the reactant composition falls within the parallelogram J, F, G, and I.

9. The process of claim 5 with the proviso that the reactant composition falls within the trapezoid I, G, B, and H.

10. The process of claim 5 with the proviso that the reactant composition falls within the triangle H, B, A.

11. A process for breaking petroleum emulsions of the water-in-oil type characterized by subjecting the emulsion to a demulsifying agent including a cogeneric mixture of a homologous series of glycol ethers of tetramethylolcyclohexanol; said cogeneric mixture being derived exclusively from tetramethylolcyclohexanol, ethylene oxide and butylene oxide in such weight proportions so the average composition of said cogeneric mixture, stated in terms of initial reactants, lies approximately within the 5-sided figure of the accompanying drawing in which the minimum tetramethylolcyclohexanol content is at least 1.5% and which 5-sided figure is identified by the fact that its area lies within the straight lines connecting A, B, C, D and H; with the proviso that the hydrophile properties of said cogeneric mixture in an equal weight of xylene, are sufficient to produce an emulsion when said xylene solution is shaken vigorously with one to three volumes of water.

12. The process of claim 11 with the proviso that oxyalkylation takes place in presence of an alkaline catalyst.

13. The process of claim 11 with the proviso that oxyalkylation takes place in presence of an alkaline catalyst and that the butylene oxide be added first.

14. The process of claim 11 with the proviso that oxyalkylation takes place in presence of an alkaline catalyst and that the butylene oxide be added first, and with the further proviso that the butylene oxide is substantially free from isobutylene oxide.

15. The process of claim 11 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

16. The process of claim 15 with the proviso that the reactant composition falls within the triangular area defined by C, D, and E.

17. The process of claim 15 with the proviso that the reactant composition falls within the parallelogram D, E, F, and J.

18. The process of claim 15 with the proviso that the reactant composition falls within the parallelogram J, F, G, and I.

19. The process of claim 15 with the proviso that the reactant composition falls within the trapezoid I, G, B, and H.

20. The process of claim 15 with the proviso that the reactant composition falls within the triangle H, B, A.

References Cited in the file of this patent

UNITED STATES PATENTS

| | | |
|---|---|---|
| 2,493,733 | Witcoff | Jan. 3, 1950 |
| 2,507,910 | Keiser et al. | May 16, 1950 |
| 2,527,970 | Sokol | Oct. 31, 1950 |
| 2,574,544 | De Groote | Nov. 13, 1951 |
| 2,617,830 | Kosmin | Nov. 11, 1952 |
| 2,624,766 | Butler | Jan. 6, 1953 |
| 2,652,418 | De Groote | Sept. 15, 1953 |
| 2,662,859 | Kirkpatrick | Dec. 15, 1953 |
| 2,677,700 | Jackson et al. | May 4, 1954 |

Disclaimer and Dedication 2,819,214.—*Melvin De Groote*, University City, and *Owen H. Pettingill*, Kirkwood, Mo. PROCESS FOR BREAKING PETROLEUM EMULSIONS EMPLOYING CERTAIN OXYALKYLATED TETRAMETHYLOLCYCLOHEXANOLS. Patent dated Jan. 7, 1958. Disclaimer and dedication filed Jan. 28, 1959, by the assignee, *Petrolite Corporation*.

Hereby disclaims and dedicates to the public the entire term of said patent.
[*Official Gazette March 3, 1959.*]